UNITED STATES PATENT OFFICE.

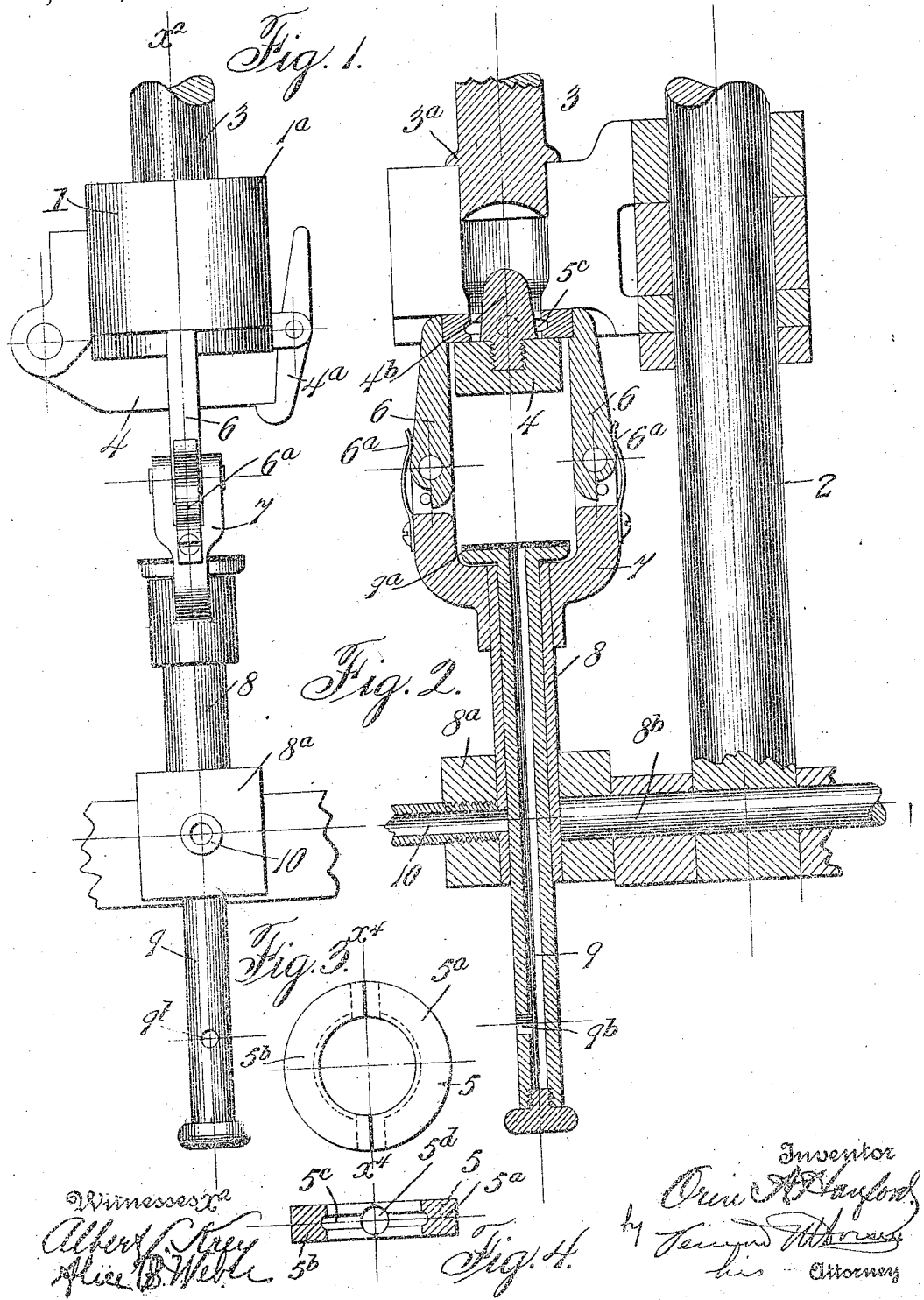

ORIN A. HANFORD, OF ROCHESTER, NEW YORK, ASSIGNOR TO EMPIRE MACHINE COMPANY, OF PORTLAND, MAINE, A CORPORATION OF MAINE.

GLASS-FORMING MACHINE.

1,199,695. Specification of Letters Patent. Patented Sept. 26, 1916.

Application filed March 30, 1912, Serial No. 687,373. Renewed June 1, 1916. Serial No. 101,173.

*To all whom it may concern:*

Be it known that I, ORIN A. HANFORD, a citizen of the United States of America, and a resident of Rochester, New York, have invented certain new and useful Improvements in Glass-Forming Machines, of which the following is a specification.

My invention relates to certain improvements in glass molds, it being especially applicable for use in connection with press molds used to form blanks which are afterward to be blown, although it is applicable to any form of glass mold.

It comprises a mold and a plunger moving therein to a definite point, with means for permitting the escape from the mold of any glass dropped therein over and above the quantity necessary to make the blank of the desired volume.

My invention also comprises means for handling and blowing the pressed blank, such means including a separable clamping ring forming the bottom part of the mold, and containing passages through which the excess glass may be extruded.

It further consists in the construction, arrangement and combination of the parts of which it is composed as will be hereinafter more fully described and claimed.

Referring to the accompanying drawings in which corresponding parts are designated by corresponding marks of reference:—

Figure 1 is a front elevation of a mechanism embodying my invention. Fig. 2 is a central vertical section on line $x^2$—$x^2$ of Fig. 1. Fig. 3 is a detail plan view of the clamp ring. Fig. 4 is a vertical section on line $x^4$—$x^4$ of Fig. 3.

The two parts 1, $1^a$ of the press mold are pivoted on the standard 2, to swing in a horizontal plane and to close with the central cavity thereof below and in alinement with a plunger 3, which has a definite downward stroke in respect to the mold parts. In the drawings I have shown a shoulder $3^a$ on the plunger to contact with the top of the mold and thus determine the extent of entrance of the plunger therein.

One of the mold parts 1, has pivoted thereon a bottom 4, for the mold cavity, such bottom adapted to be caught in its raised position by a latch $4^a$ on the mold part $1^a$. The upper side of the bottom is provided with a boss $4^b$, which when the bottom is raised is located centrally in the base of the mold cavity and serves to form a central cavity in the blank.

Located between the mold parts and the bottom 4, and surrounding the boss $4^b$ is the split ring 5, divided into two halves $5^a$, $5^b$, on a diameter thereof. These halves are provided with an internal annular groove $5^c$ and each half of the ring has at each end thereof a radial channel $5^d$. The ring when assembled and in place forms the base of the mold cavity and the registering channels $5^d$ in the halves thereof, form passageways from such cavity, through which surplus glass may be extruded. Each half of the ring 5 is carried by a finger 6, provided with pressure springs $6^a$ which tends to hold the ring halves together, the fingers being pivoted in a fork 7, carried by the tubular sleeve 8, mounted in a block $8^a$ swiveled on a horizontal shaft $8^b$, carried by the standard 2 below the molds.

Sliding within the stem 8 is the hollow blowpipe 9, having a packing pad $9^a$ on its end adapted when the blow-pipe is pushed up to seat against the lower surface of the ring. When the blow-pipe is thus pushed up an aperture $9^b$ therein comes opposite to a passage 10, in the block $8^a$, and is connected with a source of air under pressure.

In the use of a device such as described, the mold being closed, the bottom raised, the clutch ring in place and the plunger raised, a quantity of glass is placed in the mold cavity. The plunger is now depressed and the mass of glass molded, any surplus glass over that which is required to form the blank being pressed through the channels $5^d$. The latch $4^a$ is now released and the bottom 4 allowed to drop and the mold opened, leaving the pressed blank supported by the clutch ring, the groove $5^c$ holding it firmly in place. The stem 8 may be now swung on the shaft $8^b$ to manipulate the blank carried through the fingers 6, and to place it downwardly for blowing, which can be done by sliding the blow-pipe 9 in the stem 8 until the packing seats against the lower face of the clamp ring. After the blowing the ring halves may be separated and the finished article removed therefrom.

It will be noted that by dividing the ring on the line of the channels $5^d$, the removal of the finished article is not impeded by the pins of glass which have been extruded into such channels.

Having thus described my invention what I claim is:—

1. The combination with separable mold parts, of a plunger moving therein from one end to a definite distance, and a separable ring forming the opposite end of the mold cavity and having channels therein for the escape of surplus glass.

2. The combination with separable mold parts, of a plunger moving thereon from one end to a definite distance, and a separable ring forming the opposite end of the mold cavity and having channels therein for the escape of surplus glass, the ring being divided on the line of the channels.

In testimony whereof I have signed my name in the presence of two witnesses.

ORIN A. HANFORD.

Witnesses:
 ZORA B. SAUNDERS,
 C. J. RICE.